United States Patent
Carrasco et al.

(10) Patent No.: US 10,208,759 B2
(45) Date of Patent: Feb. 19, 2019

(54) COMPACT TURBOMACHINE WITH MAGNETIC BEARINGS AND AUXILIARY BEARINGS

(71) Applicants: Eduardo Carrasco, Saint Etienne sous Bailleul (FR); Eric Helene, Oissel (FR)

(72) Inventors: Eduardo Carrasco, Saint Etienne sous Bailleul (FR); Eric Helene, Oissel (FR)

(73) Assignee: SKF Magnetic Mechatronics, rue des Champs (FR)

( * ) Notice: Subject to any disclaimer, the term of this patent is extended or adjusted under 35 U.S.C. 154(b) by 435 days.

(21) Appl. No.: 14/224,401

(22) Filed: Mar. 25, 2014

(65) Prior Publication Data

US 2015/0275911 A1    Oct. 1, 2015

(51) Int. Cl.

| | |
|---|---|
| *F04D 29/048* | (2006.01) |
| *F04D 29/058* | (2006.01) |
| *F04D 17/10* | (2006.01) |
| *F04D 25/06* | (2006.01) |
| *F16C 32/04* | (2006.01) |
| *F04D 29/051* | (2006.01) |
| *F04D 29/059* | (2006.01) |
| *F04D 29/62* | (2006.01) |

(52) U.S. Cl.
CPC ........... *F04D 29/058* (2013.01); *F04D 17/10* (2013.01); *F04D 25/06* (2013.01); *F04D 29/048* (2013.01); *F04D 29/051* (2013.01); *F04D 29/059* (2013.01); *F04D 29/622* (2013.01); *F16C 32/0442* (2013.01)

(58) Field of Classification Search
CPC .... F04D 29/056; F04D 29/058; F04D 29/059; F04D 29/051; F04D 59/622; F04D 24/06; F04D 17/10; F04D 29/048; F16C 32/0402; F16C 32/0406; F16C 32/044; F16C 32/0442; F16C 32/0444; F01D 25/16; F01D 25/162; F01D 25/166
See application file for complete search history.

(56) References Cited

U.S. PATENT DOCUMENTS 4,273,512 A * 6/1981 Weiler .................... F01D 5/063
                                                                29/889.4
4,652,780 A * 3/1987 Murakami .......... F16C 32/0465
                                                                310/90.5

(Continued)

FOREIGN PATENT DOCUMENTS

| DE | 10032984 A1 | 1/2002 | |
|---|---|---|---|
| EP | 0470637 A1 | 2/1992 | |
| EP | 1083349 A1 * | 3/2001 | ........... F04D 19/048 |

*Primary Examiner* — Philip E Stimpert
(74) *Attorney, Agent, or Firm* — Bryan Peckjian; SKF USA Inc. Patent Dept.

(57) ABSTRACT

A turbo-machine for compressing or expanding a fluid comprises a housing, a rotary shaft, an electric machine, an impeller mounted at an end of the rotary shaft, radial magnetic bearings, an axial magnetic bearing, an axial detector, radial detectors, a control circuit, and auxiliary bearings. An auxiliary bearing is integrated within a stator portion of the axial magnetic bearing and this stator portion of the axial magnetic bearing is located opposite a rotor armature of the axial magnetic bearing. The rotor armature is made of iron or of a material which is adapted to be attracted in a magnetic field and is constituted by a rear face of the impeller.

21 Claims, 4 Drawing Sheets

(56) References Cited

U.S. PATENT DOCUMENTS 5,977,677 A * 11/1999 Henry ................... F01D 25/164
                                                  310/90
2009/0015012 A1 * 1/2009 Metzler ................. F01D 15/10
                                                  290/52

* cited by examiner

COMPACT TURBOMACHINE WITH MAGNETIC BEARINGS AND AUXILIARY BEARINGS

CROSS-REFERENCE TO RELATED APPLICATIONS

This application claims priority to European Patent Application No. EP13305359 filed Mar. 25, 2013, which is incorporated herein in its entirety.

FIELD OF THE INVENTION

The present invention relates to a compact turbo-machine with magnetic bearings and auxiliary bearings as well as an axial magnetic bearing for a compact turbo-machine.

DESCRIPTION OF THE RELATED ART

Document WO 91/17361 A1 discloses a compressor wherein the axial journaling is carried out by means of a magnet bearing assembly, adapted to receive its control from an element measuring the axial position of the rotating compressor components.

The compressor disclosed in document WO 91/17361 A1 is illustrated in FIG. 5. The compressor comprises a body 1, a compressor unit 2 and an electric motor 3. A rotor wheel 4 included in the compressor unit 2, a rotor 5 included in the electric motor 3 and a radial plate 7 included in a magnet bearing assembly 6, are all mounted on a main shaft 8 to be rotated concentrically around the center axis of the main shaft 8 upon a bearing assembly included in the body 1. The bearing assembly comprises a radial bearing array 9 with contactless radial bearings 9a, 9b which are mounted on body 1 on either side of electric motor 3 in the longitudinal direction of the main shaft 8. The bearing assembly further comprises an axial magnet bearing assembly 6 cooperating with the radial plate 7. The compressor unit 2 includes a stator section 10 whose intake duct 11 is fitted with a means 12 measuring the position of the rotating compressor components especially that of rotor wheel 4. The sensing means 12 is electrically connected via lines 13 with a control circuit 14 for controlling the operation of the axial magnet bearing assembly 6. Power supply is arranged from control circuit 14 along conductors 15a, 15b to electromagnets 16a, 16b which are located in a chamber 17 surrounding the radial plate 7. On the opposite side relative to intake duct 11 of the rotor wheel 4, the body 1 is provided with a non-contact sealing 19 between the rotating compressor components and the body 1.

The compressor of FIG. 5 is only an example of a known machine equipped with an axial magnetic bearing 6. The embodiment of FIG. 5 which implies the use of a radial plate 7 mounted on the main shaft 8 furthest away from the rotor wheel 4 increases the length of the machine and implies a specific mounting assembly. Moreover the radial plate 7 may induce further losses due to fluid friction.

Document U.S. Pat. No. 4,948,348 A discloses an immersion pump having a support for a shaft and a ferromagnetic impeller wheel mounted to the shaft. A controllable electromagnet operates to axially support and position the impeller wheel. However permanent magnets are used as radial bearings for this vertically arranged shaft and the overall arrangement is generally not satisfactory and is not adapted to a horizontally arranged shaft.

Document US 2004/0022653 A1 discloses a rotary machine comprising a rotary shaft supported by first and radial magnetic bearings that are electrically controlled by a control device. An axial abutment device comprises a rotor formed by a disc secured on the rotary shaft and interposed between two stators formed annularly around the rotary shaft and each including an annular coil controlled electrically by a system for servo-controlling the axial position of the shaft. This document discloses a centrifugal compressor further comprising passive auxiliary bearings such as ball bearings or smooth bearings which serve to receive the rotary shaft in the event of a failure of the magnetic bearings. Such a machine is not compact due to the sequential arrangement of radial magnetic bearings, passive auxiliary bearings and an axial abutment device.

SUMMARY OF THE INVENTION

It is therefore an object of the present invention to provide a turbo-machine with magnetic bearings and auxiliary bearings which remedies the above-mentioned problems and in particular that is more compact than the known turbo-machines.

It is a further object of the invention to provide a turbo-machine which has a reduced axial length, which is easier to assemble and which has an increased stiffness.

A further object of the invention is to enable to master all the air gaps of the turbo-machine more precisely.

The invention further relates to an improved axial magnetic bearing for a compact turbo-machine.

According to the invention, it is proposed not only to use the impeller of the turbo-machine as a thrust disc of an axial magnetic bearing, but also to integrate an auxiliary bearing (which is also called "landing bearing", "back up bearing" or "emergency touch down bearing") in the axial magnetic bearing itself.

The invention more specifically relates to a turbo-machine for compressing or expanding a fluid, comprising a housing, a rotary shaft which is mounted within said housing, an electric machine associated with said rotary shaft, at least a first impeller for compressing or expanding the fluid, said at least first impeller being mounted at a first end of said rotary shaft, radial magnetic bearings for radially supporting the rotary shaft in a contactless manner, at least a first axial magnetic bearing, at least one axial detector for sensing the axial position of the rotary shaft, radial detectors for sensing the radial position of the rotary shaft, a control circuit for controlling said at least first axial magnetic bearing and said radial magnetic bearings from information signals outputted by said at least one axial detector and said radial detectors, and auxiliary bearings, characterized in that at least a first auxiliary bearing is integrated within a first stator portion of said at least first axial magnetic bearing and in that said first stator portion of said at least first axial magnetic bearing is located opposite a first rotor armature of said at least first axial magnetic bearing, said first rotor armature being made of iron or of a material which is adapted to be attracted in a magnetic field (collectively referred to as a magnetically attracted material) and being constituted by a rear face of said at least first impeller.

According to a first possible embodiment, the first rotor armature being made of iron or of a material which is adapted to be attracted in a magnetic field (collectively referred to as a magnetically attracted material) is constituted by a separate element which is mounted on the at least first impeller to constitute the rear face of the at least first impeller, the at least first impeller being itself made of a material which is not adapted to be attracted in a magnetic field.

According to a second possible embodiment, the first rotor armature being constituted by the rear face of the at least first impeller is an integral part of the first impeller which is itself made of iron or of a material which is adapted to be attracted in a magnetic field (collectively referred to as a magnetically attracted material).

Advantageously the at least first impeller has a larger diameter than a mean diameter of said rotary shaft.

According to a specific embodiment of the invention, the turbo-machine further comprises an insert made of a non-magnetic material which is interposed between the first stator portion of the at least first axial magnetic bearing and the at least first auxiliary bearing integrated within the first stator portion of the at least first axial magnetic bearing.

The auxiliary bearing may be a ball bearing, a needle roller bearing or a sliding bearing.

The at least first impeller may be configured to provide a radial compression or expansion of the fluid or an axial compression or expansion of the fluid.

According to an embodiment of the present invention, the turbo-machine further comprises a second impeller for compressing or expanding the fluid, said second impeller being mounted at a second end of the rotary shaft, a second axial magnetic bearing, wherein a second auxiliary bearing is integrated within a second stator portion of the second axial magnetic bearing and wherein the second stator portion of the second axial magnetic bearing is located opposite a second rotor armature of the second axial magnetic bearing, the second rotor armature being made of iron or of a material which is adapted to be attracted in a magnetic field (collectively referred to as a magnetically attracted material) and being constituted by a rear face of said second impeller.

The invention also relates to an axial magnetic bearing for a turbo-machine for compressing or expanding a fluid, said turbo-machine comprising at least a first impeller mounted at a first end of a rotary shaft supported in a contactless manner by radial magnetic bearings and auxiliary bearings, said axial magnetic bearing comprising a rotor armature and a stator portion and being adapted to be controlled by a control circuit receiving information signals outputted by at least one axial detector configured for sensing the axial position of the rotary shaft, characterized in that at least one auxiliary bearing is integrated within said stator portion of said axial magnetic The turbo-machine according to the invention may comprise an electric machine which is constituted by an electric motor or an electric generator incorporated within the stator housing.

BRIEF DESCRIPTION OF THE DRAWINGS

The above and other objects, features and advantages of the invention will become more apparent from the following description of specific embodiments when read in connection with the accompanying drawings.

DESCRIPTION OF THE PREFERRED EMBODIMENTS

Referring now in detail to the figures of the drawings, wherein like characters designate identical or corresponding parts, the present invention will be described in connection with preferred embodiments, which are given by way of examples.

Figure 2:
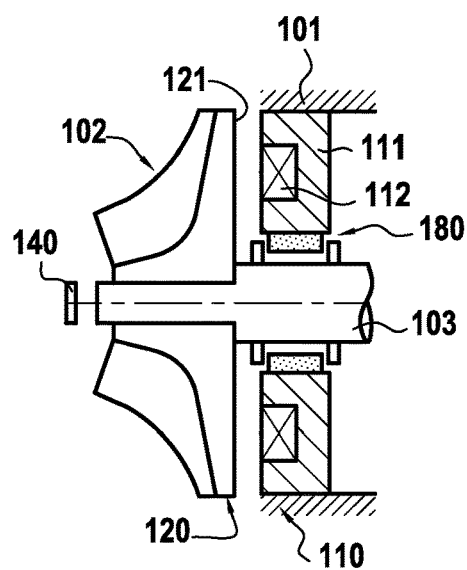
FIG. 2 is a schematic longitudinal sectional view of an axial magnetic bearing according to a second embodiment of the invention, which directly cooperates with a compressing or expanding impeller and is combined with an auxiliary needle roller bearing.
Figure 3:
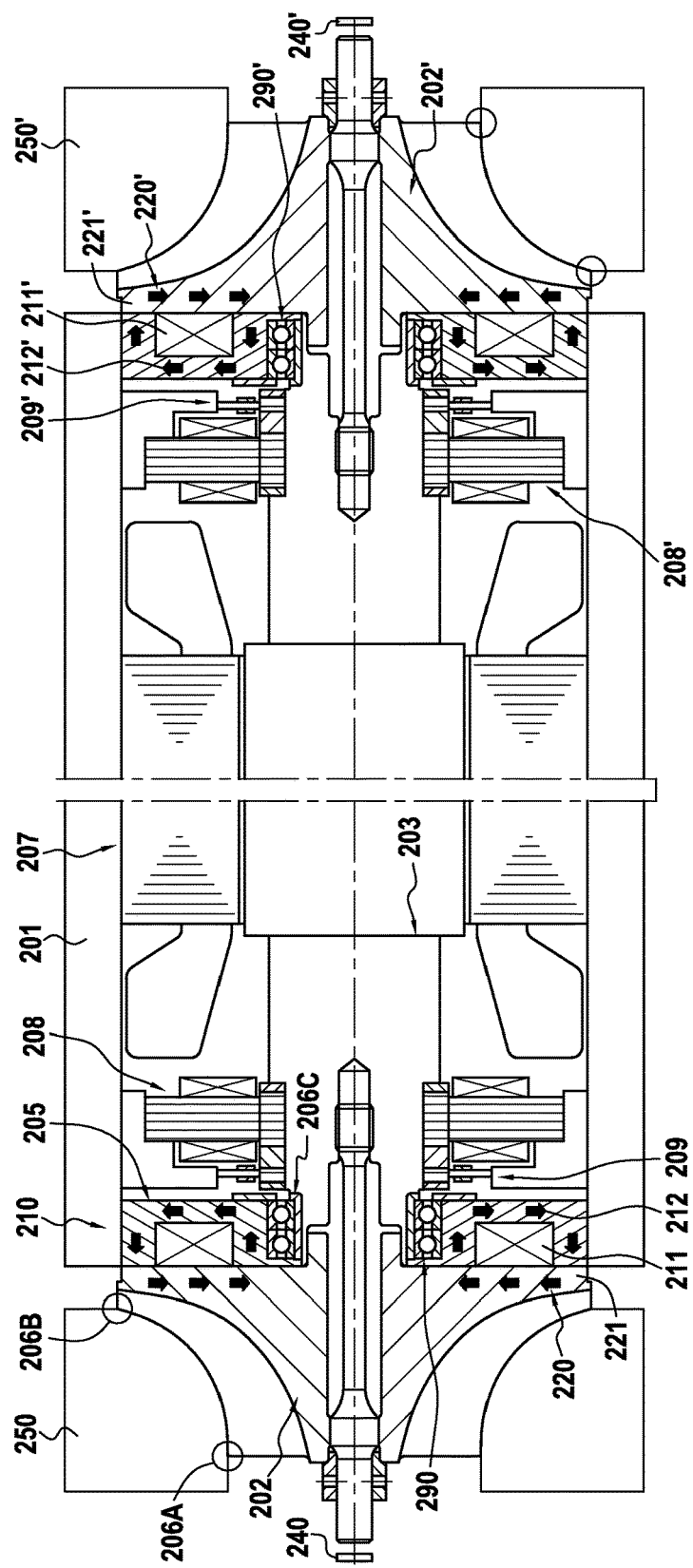
FIG. 3 is a schematic longitudinal sectional view of a turbo-machine equipped with an example of auxiliary bearings integrated in axial magnetic bearings, which directly cooperate with compressing or expanding impellers.

First of all it may be noted that the invention applies to all kinds of turbo-machines for compressing or expanding a fluid, such as compressors, pumps or turbines, which comprise at least one impeller 102 (FIGS. 1 and 2) or 202 (FIG. 3) which is located within a housing 101 (FIGS. 1 and 2) or 201 (FIG. 3) and is mounted at an end of a rotary shaft 103 (FIGS. 1 and 2) or 203 (FIG. 3). The impeller 102 or 202 may be configured to provide a radial compression or expansion of the fluid or may be configured to provide an axial compression or expansion of the fluid.

Figure 1:
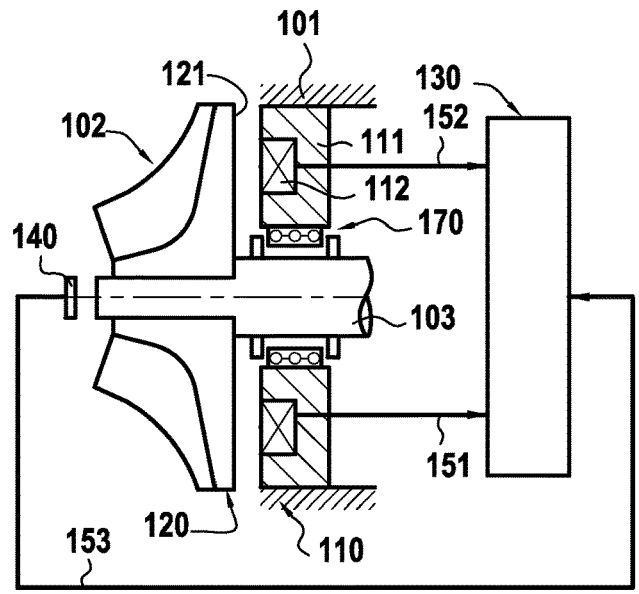
FIG. 1 is a schematic longitudinal sectional view of an axial magnetic bearing according to a first embodiment of the invention, which directly cooperates with a compressing or expanding impeller and is combined with an auxiliary ball bearing.

Referring more specifically to FIGS. 1 and 2, an axial magnetic bearing 110 is applied to a turbo-machine for compressing or expanding a fluid. The turbo-machine comprises at least one impeller 102 mounted at a first end of a rotary shaft 103 supported in a contactless manner by radial magnetic bearings (not shown in FIGS. 1 and 2)) and auxiliary bearings 170, 180.

The axial magnetic bearing 110 comprises a rotor armature 120 and a stator portion 111, 112 with coils 112 which are adapted to be controlled via lines 151, 152 by a control circuit 130 (shown only in FIG. 1) receiving via line 153 information signals outputted by at least one axial detector 140 configured for sensing the axial position of the rotary shaft 103. The stator portion 111, 112 extends outward from the auxiliary bearings 170, 180 in a radial direction and the stator portion 111, 112 is in registration with the auxiliary bearings 170, 180 in an axial direction.

According to a first specific feature of the invention, the auxiliary bearing 170 (FIG. 1) or 180 (FIG. 2) is integrated within the stator portion 111, 112 of axial magnetic bearing 110 which includes a ferromagnetic core 111 and coils 112.

According to another specific feature of the invention, the stator portion 111, 112 of the axial magnetic bearing 110 is located opposite the rotor armature 120 which is made of iron or of a material which is adapted to be attracted in a magnetic field (collectively referred to as a magnetically attracted material) and is constituted by a front face 121 of the impeller 102.

If the impeller 102 is made of iron or of a material which is adapted to be attracted in a magnetic field (collectively referred to as a magnetically attracted material), the rotor armature 120 being constituted by the front face 121 of the impeller 102 is an integral part of the impeller 102.

Alternatively, if the impeller 102 is itself made of a material which is not adapted to be attracted in a magnetic field, the rotor armature 120 which is made of iron or of a material which is adapted to be attracted in a magnetic field (collectively referred to as a magnetically attracted material) is constituted by a separate element which is mounted on the impeller 102 to constitute the front face 121 of the impeller 102.

The auxiliary bearing may be a ball bearing 170 as shown in FIG. 1, a ball bearing 290 with double rows as shown in FIG. 3, a needle roller bearing or a sliding bearing 180 as shown in FIG. 2. The auxiliary bearing may be a radial auxiliary bearing or a radial and axial auxiliary bearing.

The impeller 102 generally has a larger diameter than a mean diameter of the rotary shaft 103 or than the rest of the components of rotary shaft 203. This increases the axial load capacity. An important force may be created for a given magnetic flow.

Generally speaking according to the invention, the impeller 102 is used as a thrust disc 120 for an axial magnetic bearing 110 and an axial-radial auxiliary bearing (landing bearing) is integrated in the actuator or stator portion 111, 112 to reduce the axial length of the machine and moreover enable to master all the air-gaps more precisely as will be explained later with respect to FIG. 4A to 4C.

The present invention thus permits to increase axial load capacity, to increase the rotor stiffness and to improve the positioning tolerance of the impeller of a pump, compressor or turbine.

Using the wheel as an axial actuator and placing the auxiliary bearing 4 in the axial magnetic bearing 5 reduces the length of the rotor assembly, making it stiffer than placing each element next to the other.

The fact of having the auxiliary bearing 170, 180 or 290 directly mounted on the stator portion 111, 112 (FIGS. 1 and 2) or 211, 212 (FIGS. 3 and 4C) of the axial magnetic bearing 110 (FIGS. 1 and 2) or 210 (FIG. 3) which is itself directly related to the impeller 102 (FIGS. 1 and 2) or 202 (FIG. 3) of a turbo-machine allows for a reduced stack of tolerances that can lead to a smaller air gap 6A, 6B at impeller level for better performance.

As mentioned above the outside diameter of the impeller or turbine 102 is commonly larger than the rest of diameters on the shaft components, thus providing the advantage that for a given magnetic flow generated by a coil 112, the available surface is more important, directly increasing the load capacity.

Due to the fact that the auxiliary bearing 170, 180 or 290 is included in the corresponding axial bearing 110 or 210, a leak of magnetic flow can find its way through the auxiliary bearing 170, 180 or 290, thus reducing load capacity if saturation occurs. However in order to remedy this possible drawback it is possible to drastically reduce these leaks by placing a non-magnetic insert 295 between the stator armature 211 of the axial bearing 210 and the auxiliary bearing 290 as shown in FIGS. 3 and 4C. The stator armature 211 extends outward from the auxiliary bearings 290 in a radial direction and the stator armature 211 is in registration with the auxiliary bearings 290 in an axial direction.

Figure 5:
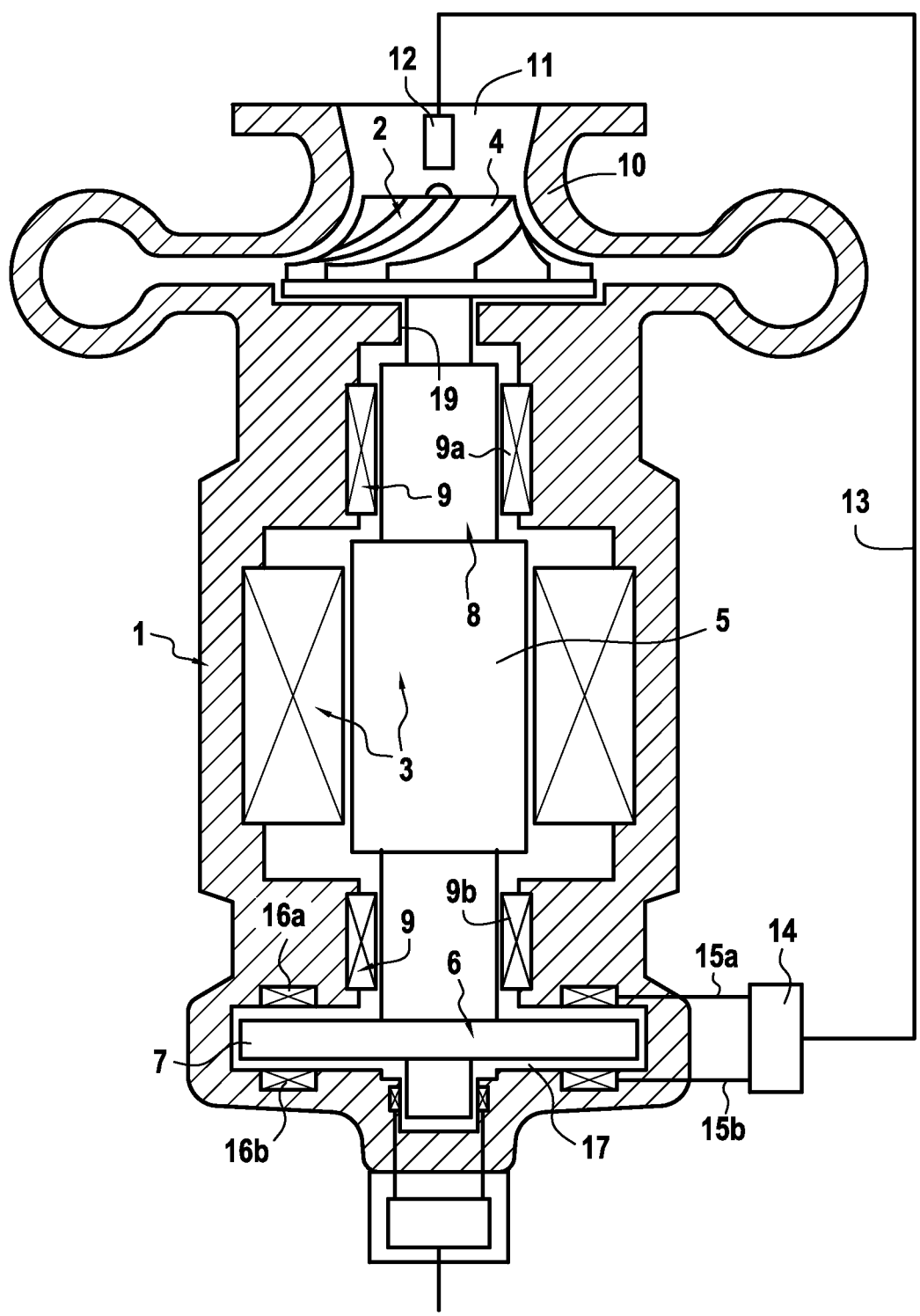
FIG. 5 is a schematic longitudinal sectional view of an example of a known turbo-machine equipped with an axial magnetic bearing.

According to the invention the rotor stiffness is improved since the rotor armature or thrust disc 120, 220 of the axial magnetic bearing 110; 210 is integrated in the impeller or turbine 102; 202 which allows for the reduction of the shaft's overall length and also implies a gain of weight since conventional separate thrust discs, such as the disc 7 in FIG. 5 are usually massive.

Since each auxiliary bearing 170, 180, 290 may be located inside an axial bearing assembly, the overall length of the shaft is reduced and two different functions are combined in one module.

Both length and weight reductions improve the stiffness of the rotor and therefore improve the dynamic behavior of the rotor at high speeds which are required for this kind of turbo-machines.

The impeller or turbine wheel 102; 202 being integral with or directly attached to a rotary armature 120; 220 of an axial magnetic bearing 110; 210 whose stator portion 111, 112 is integral with an auxiliary bearing 170; 180; 290, the positioning of the impeller or turbine wheel 102; 202 is improved since the stack of tolerances between the parts is very much reduced.

Referring to FIG. 3 and FIGS. 4A through 4C, a turbo-machine is shown which comprises first and second impellers 202, 202' which are located at first and second ends of a rotary shaft 203 within a housing 201. The shaft 203 may be rotated by an electric motor 207 which is located in a central location between first and second radial magnetic bearings 208 associated with respective radial sensors 209 for sensing the radial position of the rotary shaft 203. Two axial magnetic bearings 210, 210' each comprise a stator portion each including a ferromagnetic core 212, 212' respectively and coils 211, 211' respectively and a rotor armature 220, 220' respectively which is integral with the respective impeller 202, 202'.

The rotor armatures 220, 220' are both made of iron or of a material which is adapted to be attracted in a magnetic field (collectively referred to as a magnetically attracted material) and are constituted by a rear face 221, 221' of the impeller 202, 202' respectively which is located nearby. Moreover an auxiliary bearing 290, 290' is integrated within the stator portion 211, 212; 211', 212' respectively of the axial magnetic bearing 210; 210' respectively cooperating with the impeller 202, 202'.

In the embodiment of FIG. 3, the auxiliary bearings 290, 290' comprise double rows of balls 291 maintained between outer and inner races 292, 293 (see FIG. 4C), but these auxiliary bearings could also be designed as single row ball bearings 170 as shown in FIG. 1, as needle roller bearings or else as sliding bearings 180 as shown in FIG. 2.

For the sake of clarity in FIG. 3 only examples of sensors 190, 190' for sensing the axial position of the rotary shaft 203 are shown together with the radial sensors 209 whereas the control circuits associated with the radial magnetic bearings 208 and the axial magnetic bearings 210 and 210' to define a 5-axis suspension are not represented in FIG. 3.

As already mentioned previously the arrangement of FIG. 3 defines a compact turbo-machine of reduced length due to the fact that the impellers 202, 202' are used as thrust bearing rotary armatures and the auxiliary bearings 290, 290' are combined with the thrust bearing stator portions 211, 212; 211', 212'. The rotor assembly is thus stiffer than an arrangement where the different components would be arranged next to the others.

Figure 4A:
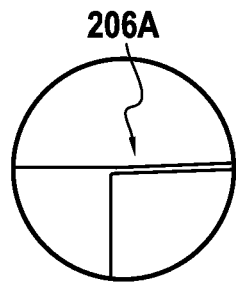
FIGS. 4A, 4B and 4C are partial views of the embodiment of FIG. 3 which show different air gaps.
Figure 4B:
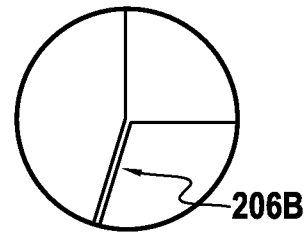
Figure 4C:
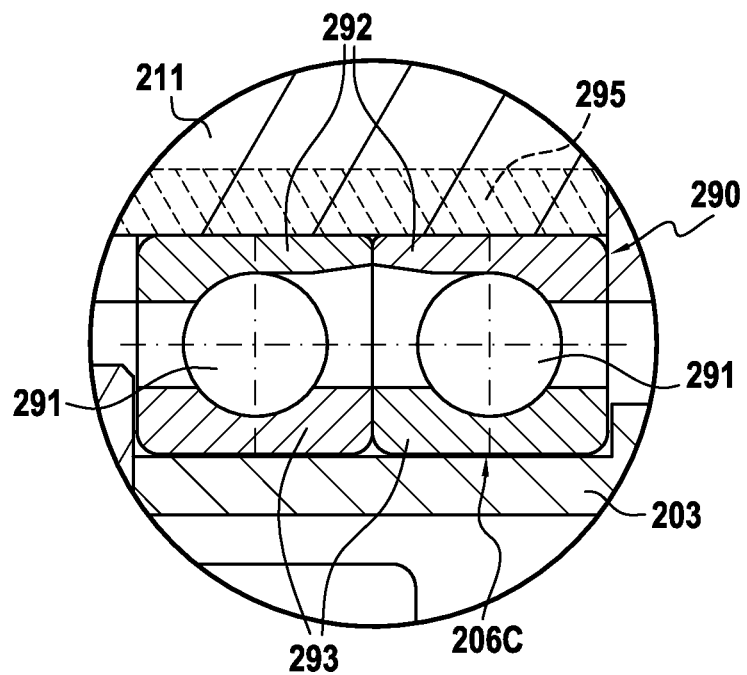

Furthermore better performance is obtained due to the fact that the stack of tolerances is reduced and air gaps 206A, 206B between the vanes of an impeller 202 and the corresponding frame 250 (or 250' for the impeller 202') are minimized, as well as the air gap 206C between an auxiliary bearing 290 and the rotary shaft 203 (see FIG. 4A to 4C).

Although preferred embodiments have been shown and described, it should be understood that any changes and modifications may be made therein without departing from the scope of the invention as defined in the appended claims. Thus although an electric motor 207 is described with reference to FIG. 3, another type of electric machine may be used, e.g. an electric generator. Furthermore although single impeller wheels are shown in the drawings, the invention could also be applied to multiple impeller wheels or multiple turbine wheels.

Furthermore although the invention may be applied to a 5-axis magnetic suspension, it may also be applied to a rotary shaft supported by a combination of active magnetic bearings (controlled electromagnets) and passive magnetic bearings (permanent magnets).

The invention claimed is:

1. A turbo-machine for compressing or expanding a fluid, comprising:
 a housing;
 a rotary shaft mounted within the housing;
 an electric machine associated with the rotary shaft;
 at least one impeller for compressing or expanding the fluid, the at least one impeller being mounted at a first end of the rotary shaft;
 radial magnetic bearings arranged to radially support the rotary shaft in a contactless manner;
 at least one axial magnetic bearing;
 at least one axial detector located and configured to sense the axial position of the rotary shaft;
 radial detectors located and configured to sense the radial position of the rotary shaft;
 a control circuit for controlling the at least one axial magnetic bearing and the radial magnetic bearings from information signals outputted by the at least one axial detector and the radial detectors;
 at least one auxiliary bearing;
 a first stator portion comprising a ferromagnetic core and coils; and
 a first rotor armature, made of a magnetically attracted material and constituted by a rear face of the at least one impeller,
 wherein the first stator portion is assembled between the housing and the auxiliary bearings, the auxiliary bearings being directly mounted to a radially interior surface of the first stator portion, the ferromagnetic core and coils of the first stator portion extending outward from the auxiliary bearings in a radial direction and the ferromagnetic core and coils of the first stator portion, the housing and the at least one auxiliary bearing each passing through a same radial plane, the housing being directly mounted to a radially exterior surface of the first stator portion,
 wherein the ferromagnetic core and coils at least partially overlapping the auxiliary bearings in an axial direction,
 wherein an interior diameter of the auxiliary bearings is positioned proximate an exterior surface of the rotary shaft,
 wherein the first stator portion of the at least one axial magnetic bearing is located opposite and facing, in an axial direction, the first rotor armature of the at least one axial magnetic bearing.

2. The turbo-machine according to claim 1, wherein the first rotor armature is constituted by a separate element which is mounted on the at least one impeller to constitute the rear face, the at least one impeller made of a material which is not adapted to be attracted in a magnetic field.

3. The turbo-machine according to claim 1, wherein the first rotor armature is an integral part of the first impeller and is made of one of iron or a material adapted to be attracted in a magnetic field.

4. The turbo-machine according to claim 3, wherein the at least one impeller has a diameter that is larger than an average diameter of the rotary shaft.

5. The turbo-machine according to claim 4, further comprising an insert made of a non-magnetic material which is interposed between the first stator portion of the at least one axial magnetic bearing and the at least one auxiliary bearing integrated within the first stator portion of the at least one axial magnetic bearing.

6. The turbo-machine according to claim 5, wherein the at least one auxiliary bearing is one of a ball bearing, a needle roller bearing, or a sliding bearing.

7. The turbo-machine according to claim 5, wherein the at least one auxiliary bearing is a sliding bearing,
 wherein the at least one impeller is configured to provide one of a radial compression or a radial expansion of the fluid.

8. The turbo-machine according to claim 5, wherein the at least one auxiliary bearing is a sliding bearing,
 wherein the at least one impeller is configured to provide one of an axial compression or an axial expansion of the fluid.

9. The turbo-machine according to claim 8, further comprising:
 a second impeller for compressing or expanding the fluid, the second impeller being mounted at a second end of the rotary shaft,
 a second axial magnetic bearing, wherein
 a second auxiliary bearing is integrated within a second stator portion of the second axial magnetic bearing and
 wherein the second stator portion of the second axial magnetic bearing is located opposite a second rotor armature of the second axial magnetic bearing, the second rotor armature being made of iron or of a material adapted to be attracted in a magnetic field and constituted by a rear face of the second impeller.

10. An axial magnetic bearing for a turbo-machine for compressing or expanding a fluid, the turbo-machine comprising:
 at least one impeller mounted at a first end of a rotary shaft supported in a contactless manner by radial magnetic bearings;
 an axial magnetic bearing including a rotor armature and a stator portion and being adapted to be controlled by a control circuit receiving information signals outputted by at least one axial detector configured for sensing the axial position of the rotary shaft;
 the rotor armature, is made of a magnetically attracted material and is constituted by a rear face of the at least one impeller;
 a first stator portion comprising a ferromagnetic core and coils;
 wherein the first stator portion is assembled between a housing and auxiliary bearings, the auxiliary bearing being directly mounted to a radially interior surface of the first stator portion, the ferromagnetic core and coils of the first stator portion extending outward from the auxiliary bearings in a radial direction and the ferromagnetic core and coils of the first stator portion, the housing and the auxiliary bearings each passing through a same radial plane, the housing being directly mounted to a radially exterior surface of the first stator portion;
 wherein the ferromagnetic core and coils at least partially overlapping the auxiliary bearings in an axial direction;
 wherein an interior diameter of the auxiliary bearings is positioned proximate an exterior surface of the rotary shaft;
 wherein the stator portion of the axial magnetic bearing is located opposite the rotor armature in an axial direction.

11. The axial magnetic bearing according to claim 10, wherein the rotor armature being made of iron or of a material which is adapted to be attracted in a magnetic field is constituted by a separate element which is mounted on the at least one impeller to constitute the rear face of the at least one impeller, wherein the at least one impeller being made of a material which is not a magnetically attracted material.

12. The axial magnetic bearing according to claim 10, wherein the first rotor armature being constituted by the rear face of the at least one impeller is an integral part of the first impeller which is made of a magnetically attracted material.

13. A turbo-machine for compressing or expanding a fluid, comprising:
a housing;
a rotary shaft mounted within the housing;
an electric machine associated with the rotary shaft;
at least one impeller for compressing or expanding the fluid, the at least one impeller being mounted at a first end of the rotary shaft;
radial magnetic bearings arranged to radially support the rotary shaft in a contactless manner;
at least one axial magnetic bearing;
at least one axial detector located and configured to sense the axial position of the rotary shaft;
radial detectors located and configured to sense the radial position of the rotary shaft;
a control circuit for controlling the at least one axial magnetic bearing and the radial magnetic bearings from information signals outputted by the at least one axial detector and the radial detectors;
at least one auxiliary bearing; and
a first stator portion comprising a ferromagnetic core and coils,
wherein the first stator portion is assembled between the housing and at least one auxiliary bearing of the plurality of auxiliary bearings, the at least one auxiliary bearing being directly mounted to a radially interior surface of the first stator portion, the ferromagnetic core and coils of the first stator portion extending outward from the auxiliary bearings in a radial direction and the ferromagnetic core and coils of the first stator portion, the housing and the at least one auxiliary bearing each passing through a same radial plane, the housing being directly mounted to a radially exterior surface of the first stator portion,
wherein the ferromagnetic core and coils at least partially overlapping the auxiliary bearings in an axial direction,
wherein an interior diameter of the at least one auxiliary bearing is positioned proximate an exterior surface of the rotary shaft,
wherein the first stator portion of the at least one axial magnetic bearing is located opposite a first rotor armature of the at least one axial magnetic bearing, and
wherein the first rotor armature is made of one of (a) iron or (b) a material which is adapted to be attracted in a magnetic field and is constituted by a rear face of the at least one impeller, wherein the controller circuit is adapted to receive signals outputted by the at least one axial detector configured for sensing the axial position of the rotary shaft and directs adjustments of the axial position the shaft using the at least one axial magnetic bearing and the radial magnetic bearings to optimize a gap between the at least one impeller and the housing.

14. The turbo-machine according to claim 13, wherein the first rotor armature is constituted by a separate element which is mounted on the at least one impeller to constitute the rear face, the at least one impeller made of a material which is not adapted to be attracted in a magnetic field.

15. The turbo-machine according to claim 13, wherein the first rotor armature is an integral part of the first impeller and is made of one of iron or a material adapted to be attracted in a magnetic field.

16. The turbo-machine according to any one of claim 15, wherein the at least one impeller has a diameter that is larger than an average diameter of the rotary shaft.

17. The turbo-machine according to claim 16, further comprising an insert made of a non-magnetic material which is interposed between the first stator portion of the at least one axial magnetic bearing and the at least one auxiliary bearing integrated within the first stator portion of the at least one axial magnetic bearing.

18. The turbo-machine according to claim 17, wherein the at least one auxiliary bearing is one of a ball bearing, needle roller bearing, and a sliding bearing.

19. The turbo-machine according to claim 17, wherein the at least one auxiliary bearing is a sliding bearing,
wherein the at least one impeller is configured to provide one of a radial compression or a radial expansion of the fluid.

20. The turbo-machine according to claim 17, wherein the at least one auxiliary bearing is a sliding bearing,
wherein the at least one impeller is configured to provide one of an axial compression or an axial expansion of the fluid.

21. The turbo-machine according to claim 20, further comprising:
a second impeller for compressing or expanding the fluid, the second impeller being mounted at a second end of the rotary shaft; and
a second axial magnetic bearing;
wherein a second auxiliary bearing is integrated within a second stator portion of the second axial magnetic bearing,
wherein the second stator portion of the second axial magnetic bearing is located opposite, and facing in an axial direction, a second rotor armature of the second axial magnetic bearing, the second rotor armature being made of a magnetically attracted material and constituted by a rear face of the second impeller.

* * * * *